United States Patent [19]

Kawahito et al.

[11] Patent Number: 4,517,168
[45] Date of Patent: May 14, 1985

[54] GRINDING AMORPHOUS SILICON NITRIDE POWDER PRIOR TO HEATING TO PRODUCE CRYSTALLINE SILICON NITRIDE POWDER

[75] Inventors: Takashi Kawahito; Yoshinori Himukashi; Tetsuo Yamada, all of Ube, Japan

[73] Assignee: UBE Industries, Ltd., Yamaguchi, Japan

[21] Appl. No.: 517,420

[22] Filed: Jul. 26, 1983

[30] Foreign Application Priority Data

Jul. 27, 1982 [JP] Japan .................................. 57-129572

[51] Int. Cl.$^3$ ..................... C01B 21/068; C04B 35/58
[52] U.S. Cl. ........................................ 423/344; 501/97
[58] Field of Search ........................... 423/344; 501/97

[56] References Cited

U.S. PATENT DOCUMENTS

| | | | |
|---|---|---|---|
| 4,073,845 | 2/1978 | Buljan et al. | 501/97 |
| 4,196,178 | 4/1980 | Iwai et al. | 423/344 |
| 4,208,215 | 6/1980 | Kleiner et al. | 423/344 |
| 4,376,652 | 3/1983 | Buljan | 501/97 |
| 4,405,589 | 9/1983 | Iwai et al. | 423/344 |

FOREIGN PATENT DOCUMENTS 2011952A 7/1979 United Kingdom .

*Primary Examiner*—Helen M. McCarthy
*Attorney, Agent, or Firm*—Finnegan, Henderson, Farabow, Garrett & Dunner

[57] ABSTRACT

Crystalline silicon nitride powder in the form of granular particles having a large tap density and having good filling characteristics is produced by heating amorphous silicon nitride powder under an inert or reducing gas atmosphere. The amorphous silicon nitride powder is ground prior to the heating and the powder to be heated is maintained at a temperature of 1250° C. to 1430° C. for at least one hour in the course of temperature rise.

4 Claims, 3 Drawing Figures

2 μm

2 μm

1 μm

GRINDING AMORPHOUS SILICON NITRIDE POWDER PRIOR TO HEATING TO PRODUCE CRYSTALLINE SILICON NITRIDE POWDER

BACKGROUND OF THE INVENTION

1. Field of the Invention

The present invention relates to a process for producing crystalline silicon nitride powder suitable for the production of sintered silicon nitride, useful as a super-hard heat resistant material.

2. Description of the Prior Art

It is known to produce crystalline silicon nitride powder by heating amorphous silicon nitride powder under an inert or reducing gas atmosphere as disclosed in, for example, U.S. Pat. No. 4,196,178. This process, however, involves disadvantages. That is, the resultant crystalline silicon nitride powder has a low tap density and is difficult to handle, due to the large number of needle crystals formed in the heating step. Therefore, only molded articles having a low bulk density can be obtained.

SUMMARY OF THE INVENTION

Accordingly, an object of the present invention is to eliminated the above-mentioned disadvantages and to provide a process for producing high-purity crystalline silicon nitride powder comprising finely divided equi-axed crystalline particles.

Other objects and advantages of the present invention will be apparent from the description set forth hereinbelow.

In accordance with the present invention, there is provided a process for producing crystalline silicon nitride powder by heating amorphous silicon nitride powder under an inert or reducing gas atmosphere, wherein the amorphous silicon nitride powder is ground prior to the heating and the powder to be heated is maintained at a temperature of 1250° C. to 1430° C. for at least one hour in the course of temperature rise.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
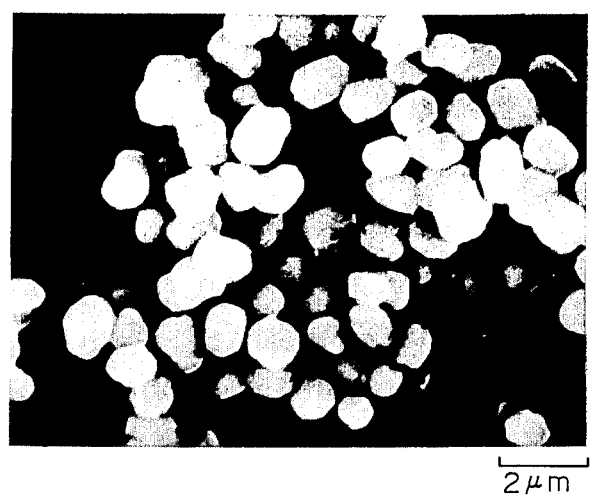
FIG. 1 is a photomicrograph (×4500), obtained by using a scanning electron microscope, of a crystalline silicon nitride powder produced in Example 1.
Figure 3:
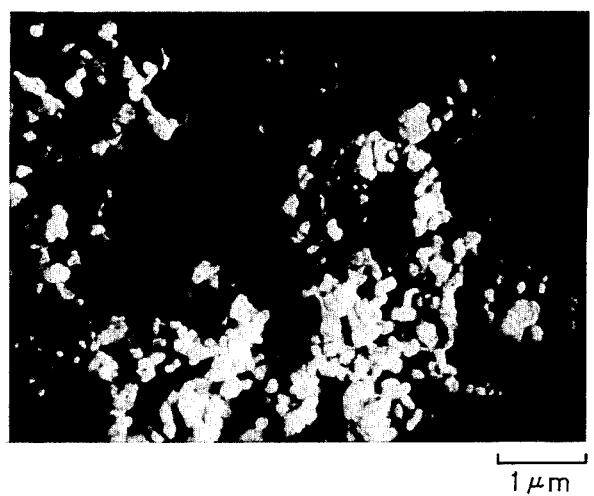
FIG. 3 is a photomicrograph (×9000), obtained by using a scanning electron microscope, of a crystalline silicon nitride powder produced in Example 7.

According to the present invention, the desired crystalline silicon nitride powder in the form of granular particles having a large tap density and having good filling characteristics can be advantageously obtained, as shown in the Examples hereinbelow and FIGS. 1 and 3. The term "tap density (g/cm$^3$)" used herein means that which is determined as follows: A 2 to 4 g amount of crystalline silicon nitride is accurately weighed and is placed in a 10 ml graduated cylinder. The bottom of the graduated cylinder is lightly tapped on a flat face until the power volume becomes constant. The powder weight is divided by the resultant powder volume.

The crystalline silicon nitride powder obtained by the present invention is especially useful as a starting material in the production of sintered silicon nitride.

The amorphous silicon nitride powder usable as a starting material in the present invention can be produced by any known methods. For example, amorphous silicon nitride powder can be produced by thermally decomposing silicon diimide, silicon tetraamide, or silicon nitrogenimide at a temperature of 600° C. to 1200° C. under a nitrogen or ammonia gas atmosphere, or by reacting a silicon halide such as silicon tetrachloride, silicon tetrabromide, or silicon tetraiodide with ammonia at an elevated temperature. The above-mentioned silicon diimide, silicon tetraamide, and silicon nitrogenimide can also be prepared by a known method, for example, by reacting a silicon halide such as silicon tetrachloride, silicon tetrabromide, or silicon tetraiodide with ammonia in a gas phase, or by reacting the above-mentioned silicon halide in the form of liquid with liquid ammonia. The average particle diameter of the amorphous silicon nitride powder is generally 0.005 to 0.1 μm.

According to the present invention, the amorphous silicon nitride powder is ground prior to heating. The grinding of the amorphous silicon nitride powder can be carried out by using any conventional grinder such as a ball mill, a vibrating ball mill, an attrition mill, and a cutter mill. The grinding time widely varies depending upon, for example, the kinds of grinders and grinding amounts of amorphous silicon nitride powder and, therefore, cannot be definitely defined. For example, in the case where 30 g of amorphous silicon nitride powder is ground by using a ball mill comprising a cylindrical shell having a size of 89 mm inner diameter and 590 ml internal volume containing 160 cylindrical rods having a size of about 10 mm diameter and about 11 mm height, the desirable grinding time is about 10 hours. The desirable grinding time for other grinders can be readily determined by those skilled in the art, with reference to the above example. The grinding of the amorphous silicon nitride powder increases the rate of crystallization of silicon nitride during heating and effectively produces the granular particles in the shape of equiaxed crystals having a small particle diameter. The action of the grinding is not clearly understood, but it would seem that, without prejudice to the present invention, the amorphous silicon nitride is subjected to mechanical impact to thereby accelerate the crystallization of the silicon nitride during heating.

Furthermore, when the grinding of amorphous silicon nitride powder is carried out in the presence of a powdered grinding auxiliary, the rate of crystallization of amorphous silicon nitride powder during heating is further increased and the particle diameters of the resultant equiaxed crystalline granular particles become smaller. Examples of the grinding auxiliaries optionally usable in the present invention are nitrides such as crystalline silicon nitride, crystalline aluminum nitride, crystalline titanium nitride, crystalline boron nitride, crystalline zirconium nitride, and crystalline tantalum nitride; carbides such as crystalline silicon carbide, crystalline aluminum carbide, crystalline titanium carbide, crystalline boron carbide, crystalline zirconium carbide, and crystalline tantalum carbide; borides such as crystalline silicon boride, crystalline aluminum boride, crystalline titanium boride, and crystalline zirconium boride; and oxides such as magnesia, alumina, silica, titania, zirconia, yttria, lanthania, and ceria. The grinding auxiliary is desirably used in an amount of 0.1 to 30 parts by weight, more desirably 0.5 to 15 parts by weight, based on 100 parts by weight of the total amount of the amorphous silicon nitride and the grinding auxiliary. The grinding auxiliary can be added to either the amorphous silicon nitride powder or the precursor thereof (e.g., silicon diimide, silicon tetraamide, and silicon nitrogenamide). Furthermore, the precursor of the grinding auxiliary (e.g., titanium tetrachloride, aluminum ethoxide, yttrium chloride, yttrium isopropoxide, and zirconium chloride) can be previously added to the precursor of the amorphous silicon nitride. For example, starting silicon tetrachloride containing a small amount of the added titanium tetrachloride can be reacted with ammonia in the synthesis of silicon diimide.

According to the present invention, the ground amorphous silicon nitride powder is heated under an inert or reducing gas atmosphere. Examples of the inert gas are nitrogen, argon, and helium. Examples of the reducing gas are hydrogen ammonia and carbon monoxide.

The amorphous silicon nitride to be heated should be maintained at a temperature of 1250° C. to 1430° C. for at least one hour, desirably 2 to 30 hours, in the course of the temperature rise. When the amorphous silicon nitride is not maintained at a temperature of 1250° C. to 1430° C. for at least one hour, a large amount of rod-like or fibrous particles is undesirably contaminated in the resultant crystalline silicon nitride powder.

The heating of the amorphous silicon nitride is generally carried out at a temperature of 1250° C. to 1700° C., desirably 1300° C. to 1600° C. Heating at a temperature of less than 1250° C. does not effect sufficient crystallization of silicon nitride and, therefore, does not produce the desired crystalline silicon nitride powder having a high crystallinity. The crystallinity of the crystalline silicon nitride is increased with the increase in the heating temperature when the amorphous silicon nitride powder is heated at a temperature of not less than 1250° C. As mentioned above, the amorphous silicon nitride powder to be heated should be maintained at a temperature of 1250° C. to 1430° C. for at least one hour. However, after the amorphous silicon nitride powder is maintained at a temperature of 1250° C. to 1430° C. for at least one hour, the silicon nitride powder can be heated at a temperature of up to 1700° C. Heating of the silicon nitride powder at a temperature of more than 1700° C. results in the undesirable growth of crystalline particles.

In the practice of the heating, the amorphous silicon nitride powder is desirably heated in a heating furnace or oven made of carbonaceous material, graphite, or silicon carbide containing an excess amount of free carbon, or in the presence of the mass of the above-mentioned material from the viewpoint that a larger amount of crystalline silicon nitride powder composed of equi-axed crystalline granular particles can be obtained. Furthermore, when a large amount of the amorphous silicon nitride powder is heated, a heat transfer plate made of a heat resistant metal, a carbonaceous material, or graphite is desirably imbedded in the amorphous silicon nitride powder to be heated to transfer the heat of the crystallization. Thus, the undesirable temperature rise of the powder due to the generation of the heat of the crystallization can be effectively prevented.

EXAMPLES

The present invention will now be further illustrated by, but is by no means limited to, the following examples and comparative examples in which all percentages are expressed on a weight basis unless otherwise specified.

In the following examples and comparative examples, the alpha-type crystalline content of the crystalline silicon nitride powder was determined according to a X-ray diffraction method described in Ceramic Bulletin, 56, 777–780 (1977), the chlorine content of the crystalline silicon nitride powder was determined by X-ray fluorescence analysis, and the specific surface area was determined by a BET method based on nitrogen adsorption of the powder.

EXAMPLES 1 TO 3

A 30 g amount of amorphous silicon nitride powder obtained from the thermal decomposition of silicon diimide at a temperature of 1000° C. was charged into a ball mill made of silicon nitride (manufactured by NGK Spark Plug Co., Ltd.) having a size of 89 mm inner diameter and 590 ml inner volume containing 160 cylindrical rods having a size of 10 mm diameter and 11 mm height. Then, the amorphous silicon nitride powder was ground at a speed of 105 rpm for 24 hours. The ground powder was filled in a graphite crucible and was heated from room temperature to a heating temperature listed in Table 1 under a nitrogen gas atmosphere at a temperature rising rate of 250° C./hr and, then, was heated at the same temperature for 5 hours. Thus, silicon nitride powder mainly consisting of crystalline phase was mainly obtained.

The properties of the resultant silicon nitride powder are shown in Table 1. The scanning electron micrograph (×4500) of the resultant crystalline silicon nitride powder of Example 1 is shown in FIG. 1.

COMPARATIVE EXAMPLES 1 TO 3

The procedure of Example 1 was repeated, except that the grinding of the amorphous silicon nitride powder was not carried out and that the heating temperature was changed to that listed in Table 1.

Figure 2:
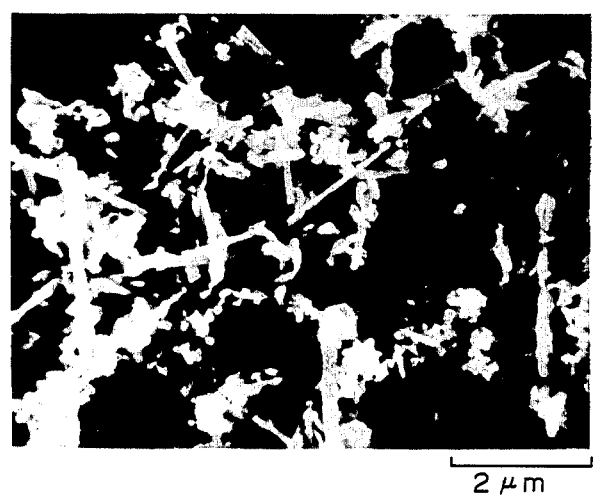
FIG. 2 is a photomicrograph (×7200), obtained by using a scanning electron microscope, of a crystalline silicon nitride powder produced in Comparative Example 3.

The results are shown in Table 1. The scanning electron micrograph (×7200) of the resultant crystalline silicon nitride powder of Comparative Example 3 is shown in FIG. 2.

TABLE 1

| | Heating temp. (°C.) | Nitrogen content (%) | Oxygen content (%) | Chlorine content (ppm) | Crystallinity (%) | Alpha-phase content (%) | Specific surface area (m²/g) | Tap density (g/cm³) | Particle shape | Average particle diameter* (μm) |
|---|---|---|---|---|---|---|---|---|---|---|
| Example 1 | 1410 | 38.7 | 1.4 | not more than 100 | 100 | 100 | 5.8 | 1.32 | Granular | not more than 1.0 |
| Example 2 | 1370 | 38.4 | 1.6 | not | 100 | 100 | 6.2 | 1.28 | " | not |

TABLE 1-continued

| | Heating temp. (°C.) | Nitrogen content (%) | Oxygen content (%) | Chlorine content (ppm) | Crystallinity (%) | Alpha-phase content (%) | Specific surface area (m²/g) | Tap density (g/cm³) | Particle shape | Average particle diameter* (μm) |
|---|---|---|---|---|---|---|---|---|---|---|
| Example 3 | 1330 | 38.9 | 1.0 | more than 100 not more than 100 | 85 | 100 | 6.8 | 1.24 | " | more than 1.0 not more than 1.0 |
| Comparative Example 1 | 1435 | 38.5 | 1.4 | not more than 100 | 100 | 95 | 9.0 | 0.78 | Fibrous | not more than 0.3 |
| Comparative Example 2 | 1440 | 38.7 | 1.5 | not more than 100 | 100 | 95 | 11.2 | 0.81 | " | not more than 0.3 |
| Comparative Example 3 | 1460 | 38.3 | 1.1 | not more than 100 | 100 | 96 | 8.5 | 0.84 | " | not more than 0.3 |

*Diameter of fiber axis in the case of fibrous particle

EXAMPLES 4 TO 6

A 200 g amount of amorphous silicon nitride powder obtained from the thermal decomposition of silicon diimide at a temperature of 1000° C. was charged into a vibrating type ball mill (Model BMC-15 manufactured by Chuuo Kakouki K. K.) having a size of 25 cm inner diameter and 5.1 liter inner volume containing 1000 balls having a diameter of 14 mm and, then, was ground for one hour. The ground powder was filled in a crucible made of silicon carbide containing an excess amount of free carbon and, then, was heated from room temperature to a temperature of 1150° C. under a gas atmosphere listed in Table 2 at a temperature rising rate of 200° C./hr. Thereafter, the powder was heated to a heating temperature listed in Table 2 at a temperature rising rate listed in Table 2 and, then, was further maintained at the same temperature for one hour. Thus, the crystalline silicon nitride powder was obtained.

The results are shown in Table 2.

EXAMPLES 7 TO 9

A 5 g amount of alpha-type crystalline silicon nitride powder having an average particle diameter of 0.1 μm and a specific surface area of 20 m²/g was added to 100 g of amorphous silicon nitride powder obtained from the thermal decomposition of silicon diimide at a temperature of 1000° C. The mixture was charged into the vibrating type ball mill used in Example 4 and ground for one hour. The ground powder was filled in a graphite crucible and, then, was heated from room temperature to a heating temperature listed in Table 3 under a nitrogen gas atmosphere at a temperature rising rate of 200° C./hr, followed by heating at the same temperature for 3 hours. Thus, crystalline silicon nitride powder was mainly obtained.

The results are shown in Table 3. The scanning electron micrograph (×9000) of the resultant crystalline silicon nitride powder of Example 7 is shown in FIG. 3. As is clear from FIG. 3, crystalline silicon nitride powder having a particle size of 0.3 μm or less can be obtained by grinding amorphous silicon nitride powder in the presence of the grinding auxiliary.

TABLE 2

| | Heating atmosphere | Temperature rising rate (°C./hr) | Heating temp. (°C.) | Nitrogen content (%) | Oxygen content (%) | Chlorine content (ppm) | Crystallinity (%) | Alpha-phase content (%) | Specific surface area (m²/g) | Tap density (g/cm³) | Particle shape | Average particle diameter (μm) |
|---|---|---|---|---|---|---|---|---|---|---|---|---|
| Example 4 | N₂ | 30 | 1400 | 38.3 | 1.3 | not more than 100 | 100 | 100 | 4.2 | 1.25 | Granular | not more than 1.5 |
| Example 5 | N₂ + H₂ | 50 | 1450 | 38.7 | 0.9 | not more than 100 | 100 | 100 | 3.9 | 1.28 | " | not more than 1.5 |
| Example 6 | NH₃ | 60 | 1500 | 38.2 | 1.6 | not more than 100 | 100 | 100 | 3.5 | 1.33 | " | not more than 1.5 |

TABLE 3

| | Heating temp. (°C.) | Nitrogen content (%) | Oxygen content (%) | Chlorine content (ppm) | Crystallinity (%) | Alpha-phase content (%) | Specific surface area (m$^2$/g) | Tap density (g/cm$^3$) | Particle shape | Average particle diameter (μm) |
|---|---|---|---|---|---|---|---|---|---|---|
| Example 7 | 1390 | 39.0 | 0.9 | not more than 100 | 100 | 97 | 10.8 | 1.28 | Granular | not more than 0.3 |
| Example 8 | 1350 | 38.8 | 1.2 | not more than 100 | 100 | 95 | 11.5 | 1.26 | " | not more than 0.3 |
| Example 9 | 1310 | 39.1 | 1.3 | not more than 100 | 92 | 96 | 13.2 | 1.21 | " | not more than 0.3 |

We claim:

1. A process for producing equiaxed crystalline silicon nitride powder having an average diameter of not more than 1.5 microns by heating amorphous silicon nitride powder under an inert or reducing gas atmosphere, wherein said amorphous silicon nitride powder is ground prior to heating and subsequently maintained at a temperature of 1250° C. to 1430° C. for at least one hour.

2. A process as claimed in claim 1, wherein the grinding is carried out in the presence of a particulate crystalline grinding auxiliary.

3. A process as claimed in claim 2, wherein the grinding auxiliary is at least one member selected from the group consisting of nitrides, carbides, borides, and oxides.

4. A process as claimed in claim 2, wherein the amount of the grinding auxiliary is 0.1 to 30 parts by weight based on 100 parts by weight of the total amount of the amorphous silicon nitride and the grinding auxiliary.

* * * * *